United States Patent [19]
Itou et al.

[11] Patent Number: 5,380,606
[45] Date of Patent: Jan. 10, 1995

[54] SECONDARY BATTERY UTILIZING A MIXED BINDER

[75] Inventors: Tsukasa Itou; Kazuo Teraji; Noriyuki Yoshinaga; Sunao Harada, all of Sumoto; Kouji Negoro; Kazunari Mori, both of Hyogo, all of Japan

[73] Assignee: Sanyo Electric Co., Ltd., Osaka, Japan

[21] Appl. No.: 174,246

[22] Filed: Dec. 28, 1993

[30] Foreign Application Priority Data

Dec. 28, 1992 [JP] Japan .................. 4-348884

[51] Int. Cl.$^6$ .............................................. H01M 4/62
[52] U.S. Cl. ...................... 429/194; 429/215; 429/217
[58] Field of Search ............ 429/212, 215, 217, 194, 429/218

[56] References Cited

U.S. PATENT DOCUMENTS

| | | | |
|---|---|---|---|
| 4,888,259 | 12/1989 | Ebner | 429/217 |
| 4,980,250 | 12/1990 | Takahashi et al. | 429/217 X |
| 5,187,035 | 2/1993 | Miyabayashi et al. | 429/218 |
| 5,262,255 | 11/1993 | Ito et al. | 429/212 X |

FOREIGN PATENT DOCUMENTS

| | | |
|---|---|---|
| 62-23433 | 12/1982 | Japan . |
| 61-158665 | 7/1986 | Japan . |
| 62-117268 | 5/1987 | Japan . |

Primary Examiner—Anthony Skapars
Attorney, Agent, or Firm—Birch, Stewart, Kolasch & Birch

[57] ABSTRACT

A secondary battery has a positive electrode principally comprising a lithium-containing complex oxide, a negative electrode principally comprising a carbon material and an organic electrolyte solution, said negative electrode utilizing a mixed binder comprising a polyamic acid and at least one polymer selected from the group consisting of a polyamide resin, polyvinylpyrrolidone and a hydroxyalkylcellulose. The battery has a long cycle life and, at the same time, hardly breaks or bursts even when the battery temperature becomes abnormally high, thereby being highly reliable.

2 Claims, 3 Drawing Sheets

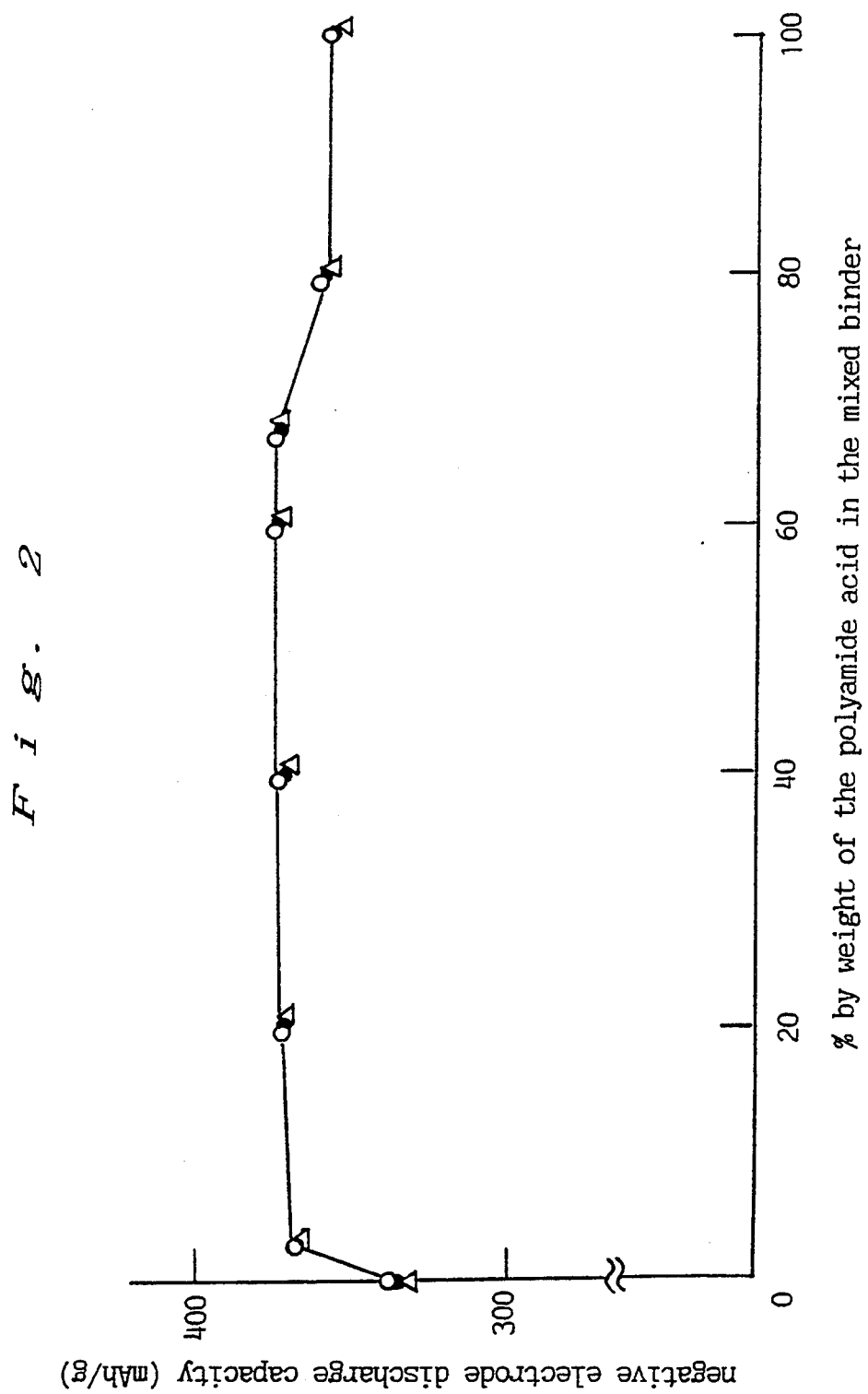

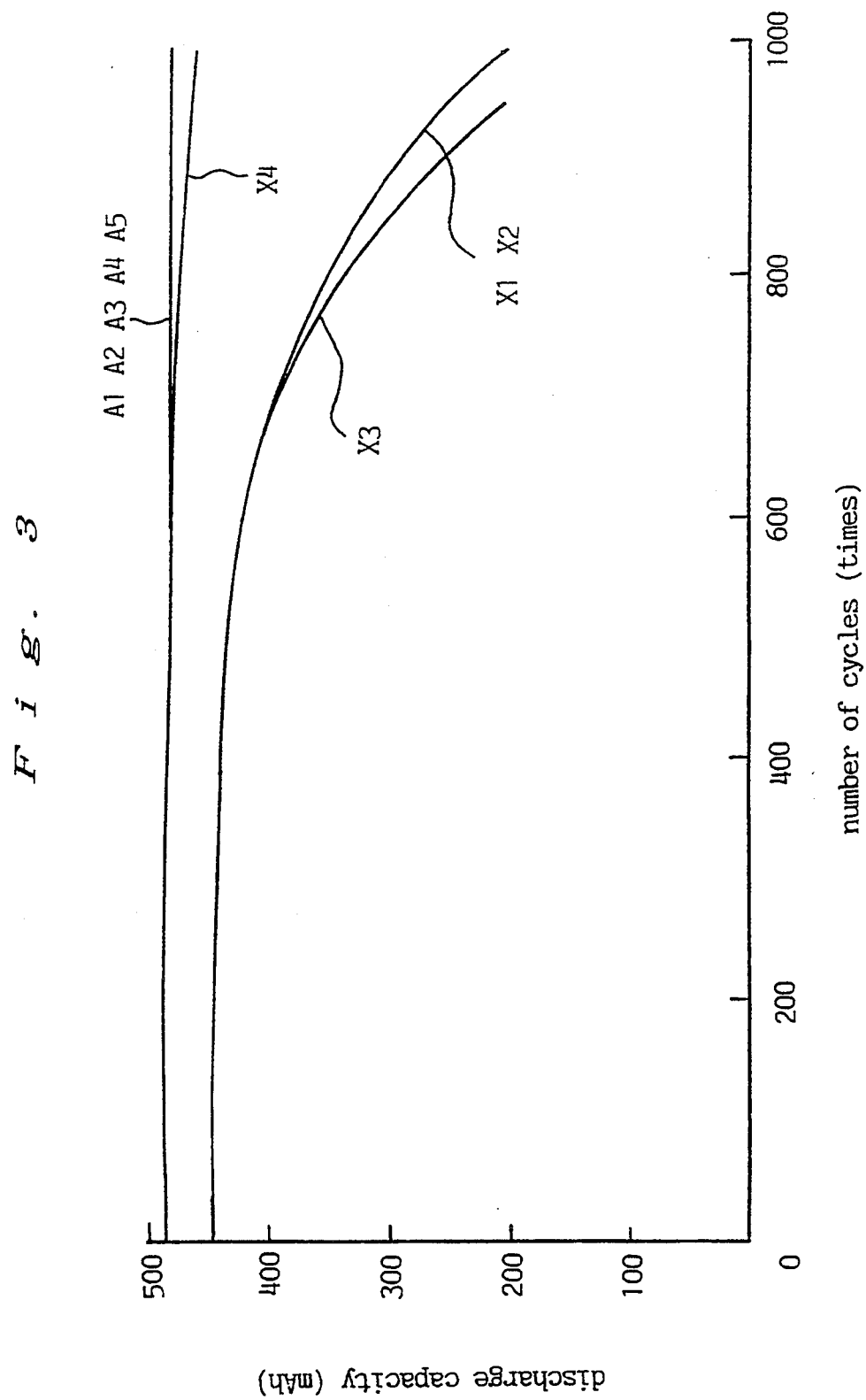

SECONDARY BATTERY UTILIZING A MIXED BINDER

BACKGROUND OF THE INVENTION

This application claims the priority of Japanese Patent Application No. 4-348884 filed Dec. 28, 1992, which is incorporated herein by reference.

1. Field of the Invention

The present invention relates to a secondary battery and, in particular, to improvement in the binder used therefor to improve its cycle characteristics.

2. Description of the Prior Art

Carbon materials such as coke and graphite have been proposed in recent years as negative electrode materials for secondary batteries with organic electrolyte solutions, for the benefits of good flexibility, no fear of depositing of mossy lithium and the like.

Negative electrodes utilizing the above carbon materials are generally prepared by a process which comprises the successive steps of dispersing a carbon powder (e.g. graphite and coke powder) and, as required, a conductive agent powder (e.g. acetylene black and carbon black) in a binder solution to obtain a slurry, applying the slurry to a collector metal using doctor blade, or by like methods, and drying the slurry on the metal.

Japanese Patent Publication No. 23433/1987 proposes a rechargeable lithium battery utilizing a negative electrode comprising as its negative electrode active material a graphite intercalation compound incorporating lithium, in which a fluororesin is used as a binder.

However, with graphite or the like incorporating lithium, the use of fluororesin as a binder causes, upon repeated charges and discharges, the carbon powder to peel off from the substrate (copper plate, copper foil or the like) of the negative electrode due to insufficient strengths for bonding the active material itself and for bonding the active material with the substrate. In this case, as a result, the battery capacity gradually decreases.

Besides, generally secondary batteries utilizing fluororesin have the problem of short cycle life. Furthermore, when the battery temperature rises due to short circuit or like accidents, the fluororesin decomposes to form HF (hydrogen fluoride), which then reacts (exothermic reaction) vigorously with $C_6Li$ that has formed in the negative electrode by charge, whereby the battery may break or burst. This also constitutes a problem with respect to reliability (safety) of such batteries.

SUMMARY OF THE INVENTION

Accordingly, an object of the present invention is to solve the above problems and provide a battery that has a long cycle life and, at the same time, resists breaks or bursts even when the battery temperature becomes abnormally high, thereby being highly reliable.

The present invention provides a secondary battery comprising a positive electrode principally comprising a lithium-containing complex oxide, a negative electrode principally comprising a carbon material and an organic electrolyte solution, said negative electrode utilizing a mixed binder comprising a polyamic acid and at least one polymer selected from the group consisting of a polyamide resin, Polyvinylpyrrolidone and a hydroxyalkylcellulose.

It is desirable that the mixed binder comprise a polyamic acid in an amount of 0.3 to 67.0% by weight.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 2 is a graph showing the relationship between the content of a polyamic acid in a mixed binder and the discharge capacity of the negative electrode; and FIG. 3 is a graph showing the cycle characteristics.

DETAILED DESCRIPTION OF THE PREFERRED EMBODIMENTS

Figure 1:
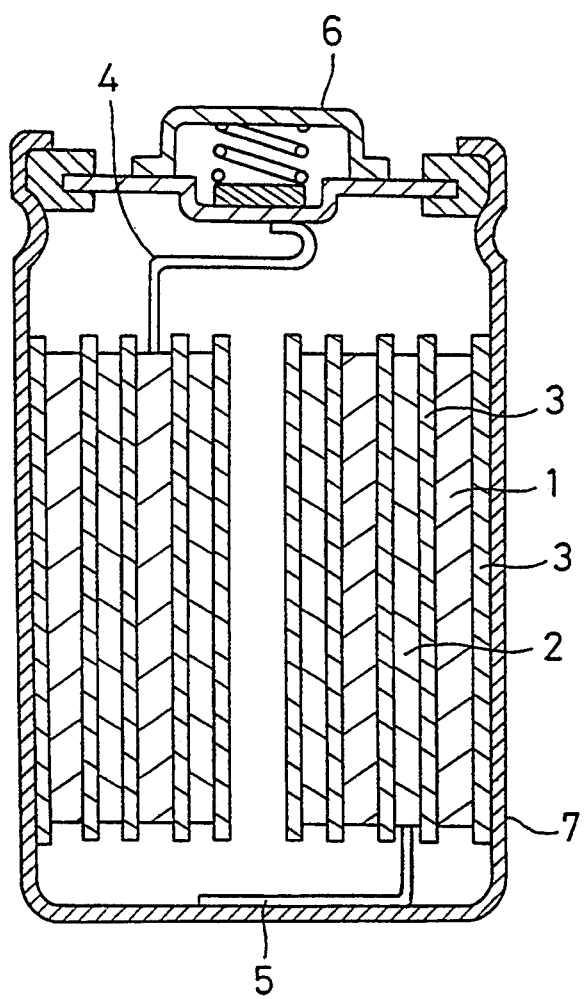
FIG. 1 is a cross-sectional view of the battery of the present invention.

According to the present invention, since a mixed binder comprising a polyamic acid and at least one polymer selected from the group consisting of a polyamide resin, polyvinylpyrrolidone and a hydroxyalkylcellulose is used, good adhesiveness among carbon particles and between the carbon powder and the negative electrode substrate can be achieved. This is considered to be due to the polyamic acid used undergoing, upon heat treatment of the negative electrode, dehydration condensation to form the corresponding polyimide, which bonds carbon particles with each other. Also, the polyamic acid reacts with the substrate to form firm bonding with the substrate, and the component mixed with the polyamic acid acts to intensify the adhesiveness among carbon particles.

Consequently, even upon repeated cycles of charge and discharge, the carbon powder can be prevented from peeling or dropping off from the substrate, whereby the decrease of battery capacity is suppressed.

With respect to the content of the polyamic acid in the mixed binder used, FIG. 2 shows that good discharge capacity is obtained with the content being in a range of 0.3 to 67.0% by weight. If the content of the polyamic acid is less than 0.3% by weight, the strength of bonding the carbon powder to the substrate decreases. On the other hand, with the content exceeding 67% by weight, which means an increase in the amount of insulating materials present between the carbon powder and the substrate, the carbon negative electrode cannot be used effectively in electrode reaction, whereby the discharge capacity decreases.

Here, if a polyamic acid alone is used for the binder, it becomes sometimes difficult, in the operation of applying a slurry comprising the binder to the substrate, to achieve uniform application, resulting in occurrence of non-uniform reaction.

However, since in the present invention a polyamic acid is used as a binder in the form of a mixture of itself with at least one polymer selected from the group consisting of a polyamide resin, polyvinylpyrrolidone and a hydroxyalkylcellulose, the slurry of the mixed binder solution with graphite dispersed therein can be uniformly applied to the substrate, so that the reaction of the negative electrode active material can be effected uniformly throughout the electrode surface.

In addition, since in the present invention the mixed binder used contains no fluorine, there is no danger associated with conventional lithium secondary batteries that the hydrogen fluoride formed by thermal decomposition of the binder used could vigorously react with $C_6Li$ to cause the battery to break or burst.

Other features of the invention will become apparent in the course of the following descriptions of exemplary embodiments which are given for illustration of the invention and are not intended to be limiting thereof.

EXAMPLES

Example 1

Preparation of Positive Electrode

A slurry for positive electrode was prepared by mixing 90 parts by weight of $LiCoO_2$ as a positive electrode active material, 6 parts by weight of graphite as a conductive agent and, as a binder, 4 parts by weight of polyvinylidene fluoride that had been dissolved in N-methyl-2-pyrrolidone. The slurry was then applied to both sides of an aluminum foil having a thickness of 20 µm as a positive electrode collector and then vacuum-dried at 110° C. for 3 hours, to obtain a positive electrode.

Preparation of Negative Electrode

A slurry for negative electrode was prepared by mixing 95 parts by weight of graphite powder having an average particle diameter of 15 µm and a mixed binder of a polyamic acid (TORAYNEECE #3000, made by Toray Industries, Inc.) and a polyamide resin (TOHMIDE #1400, made by Fuji Kasei Kogyo Co., Ltd.) which had both been dissolved in N-methyl-2-pyrrolidone in such an amount as to make the contents of the two components in the resulting total solids 1.0 part by weight and 4.0 parts by weight, respectively. The negative electrode slurry thus obtained was applied to both sides of a copper foil having a thickness of 18 µm. The foil with the slurry was then dried, pressed with a roller press and heat treated in vacuum at 350° C. for 3 hours, to give a negative electrode.

The above heat treatment is conducted at a temperature of 150° to 500° C., preferably 200° to 400° C. If the temperature is lower than 150° C., part of the polyamic acid used will remain in the negative electrode. Then, the remaining polyamic acid undergoes, when the battery temperature becomes abnormally high, dehydration condensation to form water, which would react with lithium vigorously.

On the other hand, if the heat treating temperature exceeds 500° C., the polyimide formed by dehydration condensation of the polyamic acid will start decomposition so that the adhesiveness of the substrate with the carbon powder and that of the carbon particles with each other both decrease.

In the above temperature range, the range of from 200° to 400° C. is the most suitable that does not adversely influences the polyimide that forms by dehydration condensation of polyamic acid.

Preparation of Electrolyte Solution

In a 1/1 by volume mixed solvent of ethylene carbonate and dimethyl carbonate, $LiPF_6$ was dissolved to a concentration of 1 mole/l, to obtain an electrolyte solution.

Preparation of a Battery A1 According to the Present Invention

A battery A1 according to the present invention was prepared by using the above positive electrode, negative electrode and electrolyte solution.

FIG. 1 is a cross-sectional view of the battery A1 according to the present invention. The positive electrode 1 and the negative electrode 2 were, while being spirally wound with a separator 3 sandwiched therebetween, housed in a negative electrode can 7. The positive electrode 1 was connected to a positive electrode external terminal 6 via a positive electrode lead 4, and the negative electrode 2 to the negative electrode can 7 via a negative electrode lead 5.

Example 2

A battery A2 according to the present invention was prepared in the same manner as in Example 1 except that the mixed binder used for preparing a negative electrode was a solution of 1 part by weight based on the weight of total solids of the polyamic acid and 4 parts by weight on the same basis of polyvinylpyrrolidone dissolved in N-methyl-2-pyrrolidone.

Example 3

A negative electrode slurry was prepared by mixing 1 part by weight based on the weight of total solids of the polyamic acid and 2 parts by weight on the same basis of hydroxypropylcellulose both dissolved beforehand in N-methyl-2-pyrrolidone and 97 parts by weight of graphite. The slurry thus obtained was applied to both sides of a copper foil having a thickness of 18 µm, and the foil with the slurry was dried, pressed with a roller press and then heat treated under an atmosphere of nitrogen at 400° C. for 4 hours. With other procedure being the same as followed in Example 1, a battery A3 according to the present invention was prepared.

In this case, it is desirable to conduct heat treatment at a temperature of, within the range of 150° to 500° C., in particular at least 250° C. This is because that at a temperature exceeding 250° C. the hydroxypropylcellulose decomposes and the water that forms can be removed.

The same effect can be produced with hydroxypropylmethylcellulose, hydroxybutylcellulose or hydroxyethylcellulose, in place of hydroxypropylcellulose.

Example 4

A battery A4 according to the present invention was prepared in the same manner as in Example 1 except that the mixed binder used for preparing a negative electrode was a solution of 1 part by weight based on the weight of total solids of the polyamic acid, 2 parts by weight of the polyamide resin and 2 parts by weight of polyvinylpyrrolidone dissolved in N-methyl-2-pyrrolidone previously.

Example 5

A battery A5 according to the present invention was prepared in the same manner as in Example 3 except that the mixed binder used for preparing a negative electrode was a solution of 1 part by weight based on the weight of total solids of the polyamic acid, 1 part by weight of the polyamide resin and 1 part by weight of hydroxypropylcellulose dissolved in N-methyl-2-pyrrolidone previously.

Comparative Example 1

A comparison battery X1 was prepared in the same manner as in Example 1 except that the binder used for preparing a negative electrode was a solution of 5 parts by weight based on the weight of total solids of polyvinylidene fluoride dissolved in N-methyl-2-pyrrolidone.

Comparative Example 2

A comparison battery X2 was prepared in the same manner as in Example 1 except that the binder used for preparing a negative electrode was a solution of 5 parts by weight based on the weight of total solids of the polyamide resin dissolved in N-methyl-2-pyrrolidone.

Comparative Example 3

A comparison battery X3 was prepared in the same manner as in Example 3 except that the binder used for preparing a negative electrode was a solution of 2 parts by weight based on the weight of total solids of hydroxypropylcellulose dissolved in N-methyl-2-pyrrolidone.

Comparative Example 4

A comparison battery X4 was prepared in the same manner as in Example 1 except that the binder used for preparing a negative electrode was a solution of 5 parts by weight based on the weight of total solids of the polyamic acid dissolved in N-methyl-2-pyrrolidone.

Polyamic acid content vs. negative electrode discharge capacity

FIG. 2 shows the relationship between the content of the polyamic acid and the resulting negative electrode discharge capacity, obtained by changing the content. In the FIGURE, is for a mixed binder of the polyamic acid and the polyamide resin, △ for one of the polyamic acid and polyvinylpyrrolidone and ● for one of the polyamic acid and hydroxypropylcellulose.

The negative electrode discharge capacity was measured by conducting charge and discharge in a range of 1.0 to 0 V vs. Li/Li+, with a 3-pole beaker cell provided with each of the electrodes prepared above as an acting electrode and a counter electrode and a reference electrode both comprising a lithium metal foil, at a discharge electric current density of 2 mA/cm$^2$.

In FIG. 2, the ordinate represents the negative electrode discharge capacity and the abscissa the amount of the polyamic acid in the mixed binder in terms of % by weight.

In preparing batteries according to the present invention, the total amount of the mixed binder used must be not more than 15% by weight based on the total weight. This is because presence of more than 15% of a mixed binder decreases the amount of the active material in the electrode, which results in a decrease of the battery capacity itself.

As is apparent from FIG. 2, particularly good negative electrode discharge capacity is obtained with the amount of the polyamic acid in the mixed binder used being in the range of 0.3 to 67.0% by weight.

This is considered to be due to the following facts. That is, with a polyamic acid content of less than 0.3% the adhesiveness with the substrate decreases to reduce the coefficient of use of the carbon negative electrode, whereby the discharge capacity decreases. On the other hand, with a polyamic acid content exceeding 67.0% by weight, which means that the amount of insulating components between carbon powder and the substrate increases, the carbon negative electrode is not effectively used for electrode reaction, so that the discharge capacity also decreases.

Negative electrode slurry vs. surface condition and adhesion strength of the negative electrode In the results below, the negative electrodes prepared in Examples and Comparative Examples are named a1 through a5 and x1 through x4, respectively.

The negative electrodes were each tested for thickness on 20 points and the dispersions of the obtained thicknesses are shown in Table 1. The dispersion of thicknesses was expressed in terms of the difference between the maximum value and the minimum value among 20 data measured. Separately, an adhesive tape was patched on the surface of each negative electrode and one end of the tape was pulled with a spring balance. The tensile load when the carbon powder peeled off was recorded and taken as an index of the adhesion strength of the negative electrode. Table 1 also shows the results of this test.

TABLE 1

|    | Thickness dispersion (μm) | Adhesion strength (kg/cm$^2$) |
|----|---------------------------|-------------------------------|
| a1 | 5                         | 2.3                           |
| a2 | 3                         | 2.0                           |
| a3 | 3                         | 2.2                           |
| a4 | 5                         | 2.1                           |
| a5 | 5                         | 2.2                           |
| x1 | 3                         | 0.13                          |
| x2 | 5                         | 0.20                          |
| x3 | 3                         | 0.05                          |
| x4 | 10                        | 2.3                           |

It is understood from Table 1 that the negative electrodes a1 through a5 utilizing specific mixed binders at least comprising a polyamic acid are better in the dispersion of negative electrode thickness, i.e. they are applicable more uniformly to the negative electrode substrate, than x4 utilizing a binder of the polyamic acid alone. Besides, when a1 through a5 are compared with x1 through x3, the former have higher peel strengths, thus proving better adhesiveness of carbon particles with each other and between the carbon powder and the negative electrode substrate.

It is therefore believed that the batteries of the present invention suffer only little decrease in the cycle life caused by peeling off of the carbon powder or only little cycle deterioration caused by local gathering of lithium ions resulting from a large thickness dispersion of negative electrode.

Cycle characteristics of the batteries

The batteries prepared in Examples 1 through 5 and Comparative Examples 1 through 4 were each subjected to a cycle test which comprises repeating cycles of charging at a charge current of 100 mA to a charge termination voltage of 4.2 V and then discharging at a discharge current of 200 mA to a discharge termination voltage of 2.75 V. The results are shown in FIG. 3.

FIG. 3 shows curves with the ordinate representing the discharge capacity of battery and the abscissa the number of cycles. It is understood from the FIGURE that, with the batteries A1 through A5 of the present invention, having large adhesion strength, i.e. high adhesiveness of carbon particles with each other and between the carbon powder and negative electrode substrate, the negative electrode material carbon powder resists peeling off from the negative electrodes so that the battery capacities do not decrease during long-period cycles, while with comparison batteries X1 through X3 the battery capacities decrease with increasing number of cycles, due to the increasing amounts of the carbon powder peeled off.

In addition, it is considered that with comparison battery X4 local reaction was accelerated due to large dispersion in the thickness of the negative electrode, whereby the cycle life decreases.

Obviously, numerous modifications and variations of the present invention are possible in light of the above teachings. It is therefore to be understood that within the scope of the appended claims, the invention may be practiced otherwise than as specifically described herein.

What is claimed is:

1. A secondary battery comprising a positive electrode principally comprising a lithium-containing complex oxide, a negative electrode principally comprising a carbon material and an organic electrolyte solution, said negative electrode utilizing a mixed binder comprising a polyamic acid and at least one polymer selected from the group consisting of a polyamide resin, polyvinylpyrrolidone and a hydroxyalkylcellulose.

2. The secondary battery according to claim 1, wherein said mixed binder comprises a polyamic acid in an amount of 0.3 to 67.0% by weight.

* * * * *